(12) United States Patent
Yoneno

(10) Patent No.: US 9,097,849 B2
(45) Date of Patent: Aug. 4, 2015

(54) DISPLAY DEVICE

(71) Applicant: SEIKO EPSON CORPORATION, Tokyo (JP)

(72) Inventor: Kunio Yoneno, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 238 days.

(21) Appl. No.: 13/788,821

(22) Filed: Mar. 7, 2013

(65) Prior Publication Data

US 2014/0253880 A1  Sep. 11, 2014

(51) Int. Cl.
| | |
|---|---|
| G03B 21/28 | (2006.01) |
| G02B 5/136 | (2006.01) |
| G02B 27/22 | (2006.01) |
| G02B 27/10 | (2006.01) |
| H04N 13/04 | (2006.01) |
| G03B 21/625 | (2014.01) |
| G03B 35/24 | (2006.01) |
| H04N 5/72 | (2006.01) |
| G03B 21/10 | (2006.01) |

(52) U.S. Cl.
CPC ............ *G02B 5/136* (2013.01); *G02B 27/10* (2013.01); *G02B 27/22* (2013.01); *G02B 27/2214* (2013.01); *G02B 27/2292* (2013.01); *G03B 21/28* (2013.01); *G03B 21/625* (2013.01); *G03B 35/24* (2013.01); *H04N 5/72* (2013.01); *H04N 13/04* (2013.01); *H04N 13/0488* (2013.01); *G03B 21/10* (2013.01)

(58) Field of Classification Search
CPC .... G03B 21/00; G03B 21/28; G02B 27/2292; G02B 5/136; G02B 27/10; H04N 13/0488; H04N 13/048
USPC .......................... 353/10, 50, 98; 359/477, 433
See application file for complete search history.

(56) References Cited

U.S. PATENT DOCUMENTS

| | | | |
|---|---|---|---|
| 2009/0310231 A1* | 12/2009 | Maekawa | ...................... 359/733 |
| 2010/0231860 A1 | 9/2010 | Maekawa | |
| 2011/0285965 A1* | 11/2011 | Sugiyama | ........................ 353/10 |
| 2012/0236269 A1* | 9/2012 | Yoneno | ............................ 353/99 |

FOREIGN PATENT DOCUMENTS

WO    WO 2007/116639 A1    10/2007

* cited by examiner

*Primary Examiner* — Toan Ton
*Assistant Examiner* — Magda Cruz
(74) *Attorney, Agent, or Firm* — Oliff PLC

(57) ABSTRACT

A display device includes a flat panel display (object image generator) that generates an object image, a retrotransmissive material (imaging element) that has an element surface tilted with respect to an image generation surface of the object image generator, reflects light emitted from the object image located at one side of the element surface twice, and forms the object image as a real image in a plane-symmetrical location with the element surface in a space at the other side of the element surface, and a diffusion angle limiting film (diffusion angle limiting member) that limits a diffusion angle of light from the object image generator toward the imaging element within a predetermined angle range.

7 Claims, 13 Drawing Sheets

DISPLAY DEVICE

BACKGROUND

1. Technical Field

The present invention relates to a display device.

2. Related Art

A display device including an imaging element that forms an image of a projected object and generates a real image in the air using the imaging element has been disclosed in Patent Document 1 (International Publication No. 2007/116639).

The imaging element used for the display device disclosed in Patent Document 1 includes unit optical elements each including a dihedral corner reflector having two orthogonal mirror surfaces. The imaging element has a function of generating a real image of a projected object placed in a space at one side of the element surface in a plane-symmetrical location with the element surface in a space at the other side of the element surface. Accordingly, when a solid object is placed in the space at the one side of the element surface, a stereoscopic image is generated in the plane-symmetrical location with the element surface in the space at the other side of the element surface.

If each unit optical element has one mirror surface and the mirror surfaces of the unit optical elements are in parallel to each other, a real image and a virtual image are generated at both sides of the imaging element. Accordingly, even when each unit optical element has two mirror surfaces orthogonal to each other, light reflected only once on one of the mirror surfaces forms a virtual image. Patent Document 1 has disclosed means for avoiding interference between light reflected twice and light reflected once by the unit optical element, i.e., means for avoiding interference between light forming a real image and light forming a virtual image. Patent Document 1 has disclosed that, as the means, by providing the unit optical element around the axis orthogonal to the element surface in an arbitrary rotation direction, imaging by once-reflected light may be avoided.

However, in the imaging element of Patent Document 1, there has been a problem of cost rise in rotation and arrangement of the unit optical elements in an arbitrary direction because the design and the manufacture of the imaging element become extremely complex. Further, even when the unit optical elements are rotated in an arbitrary direction, light reflected only once by the unit optical element and output stochastically inevitably exists. Accordingly, it has been impossible to completely suppress generation of a virtual image.

SUMMARY

An advantage of some aspects of the invention is to provide a display device that can reliably prevent generation of a virtual image.

An aspect of the invention is directed to a display device including an object image generator that generates an object image, and an imaging element that has an element surface tilted with respect to an image generation surface of the object image generator, reflects light emitted from the object image located at one side of the element surface twice, and forms the object image as a real image in a plane-symmetrical location with the element surface in a space at the other side of the element surface, wherein a diffusion angle of the light from the object image generator toward the imaging element is limited within a predetermined angle range.

According to the display device of the aspect of the invention, the diffusion angle of the light from the object image generator toward the imaging element is limited within the predetermined angle range, and thus, by appropriately setting the predetermined angle range, the light reflected only once by the imaging element may be avoided from entering an eye of an observer. As a result, generation of a virtual image is suppressed and a real image formed in a space is easily seen.

In the display device according to the aspect of the invention, it is desirable that a diffusion angle limiting member that limits the diffusion angle of the light from the object image generator within the predetermined angle range is provided between the object image generator and the imaging element.

According to this configuration, by appropriately designing the diffusion angle limiting member, the diffusion angle of the light from the object image generator may be limited within a desired angle range. Accordingly, for the object image generator itself, limitation of the diffusion angle of the light is unnecessary and a general display may be used.

In the display device according to the aspect of the invention, the diffusion angle limiting member may include a film-like member in which plural light-shielding parts are arranged at intervals in parallel and regions between the adjacent light-shielding parts are light transmission regions.

According to this configuration, the diffusion angle of the light may be limited using the diffusion angle limiting member having the simple configuration. Further, by providing the film-like member in close contact with the image generation surface of the object image generator, the entire display device may be made thinner.

In the display device according to the aspect of the invention, the diffusion angle limiting member may include a lens array in which plural unit lenses are arranged in one direction, and gain characteristics of the lens array may be relatively wider in one direction of the unit lenses and relatively narrower in the other direction of the unit lenses.

According to this configuration, the light-shielding parts are not used, and thus, the diffusion angle limiting member may limit the diffusion angle of the light in the predetermined direction of the unit lenses without blocking lights output at wider angles from the object image generator.

In the display device according to the aspect of the invention, it is desirable that an apparent angle range of the predetermined angle range as seen from a direction perpendicular to the element surface is less than 90 degrees.

According to this configuration, generation of a virtual image may be reliably suppressed regardless of the attachment angle of the object image generator with respect to the imaging element.

In the display device according to the aspect of the invention, it is desirable that, given that the predetermined angle range is $\theta a$ and an angle formed by a normal line of the element surface and the image generation surface is $\gamma$, $\theta a < 2 \times \tan^{-1}(1/\cos \gamma)$ is satisfied.

The angle $\gamma$ changes in response to the attachment angle of the object image generator with respect to the imaging element. Therefore, according to the configuration, by setting an optimal diffusion angle range $\theta a$ in response to the attachment angle of the object image generator with respect to the imaging element, generation of a virtual image may be reliably suppressed while an observation range of a real image is taken wider.

In the display device according to the aspect of the invention, it is desirable that the imaging element includes a retrotransmissive material having plural light transmission parts in which at least two wall surfaces orthogonal to each other of the wall surfaces of the light transmission parts are reflection surfaces.

"Retrotransmissive material" is a reflection element in which at least two wall surfaces orthogonal to each other of the wall surfaces of the light transmission parts are reflection surfaces. That is, as seen from the direction perpendicular to the element surface, like a general retroreflective material, the light entering the reflection surface is reflected in the same direction as the incident direction. On the other hand, as seen from the direction in parallel to the element surface and perpendicular to the light incident surface, like a general reflector, the light entering the reflection surface is reflected at the same reflection angle as the incident angle. The display device having the simple configuration may be realized using this type of retrotransmissive material for the imaging element.

In the display device according to the aspect of the invention, the object image generator may include a flat panel display, and the image generation surface may be an image display surface of the flat panel display.

According to this configuration, the display device that can display a real image may be realized at relatively low cost.

In the display device according to the aspect of the invention, the object image generator may include a projector and a screen, and the image generation surface may be an image display surface of the screen.

According to this configuration, the display device with the high degree of freedom in the installation method of the object image generator may be realized.

BRIEF DESCRIPTION OF THE DRAWINGS

The invention will be described with reference to the accompanying drawings, wherein like numbers reference like elements.

FIG. 2A is a plan view and FIG. 2B is an enlarged perspective view.

DESCRIPTION OF EXEMPLARY EMBODIMENTS

First Embodiment

As below, the first embodiment of the invention will be explained using FIGS. 1 to 14.

A display device of the embodiment is an example of a display device that may generate a planar image in a space.

Figure 1:
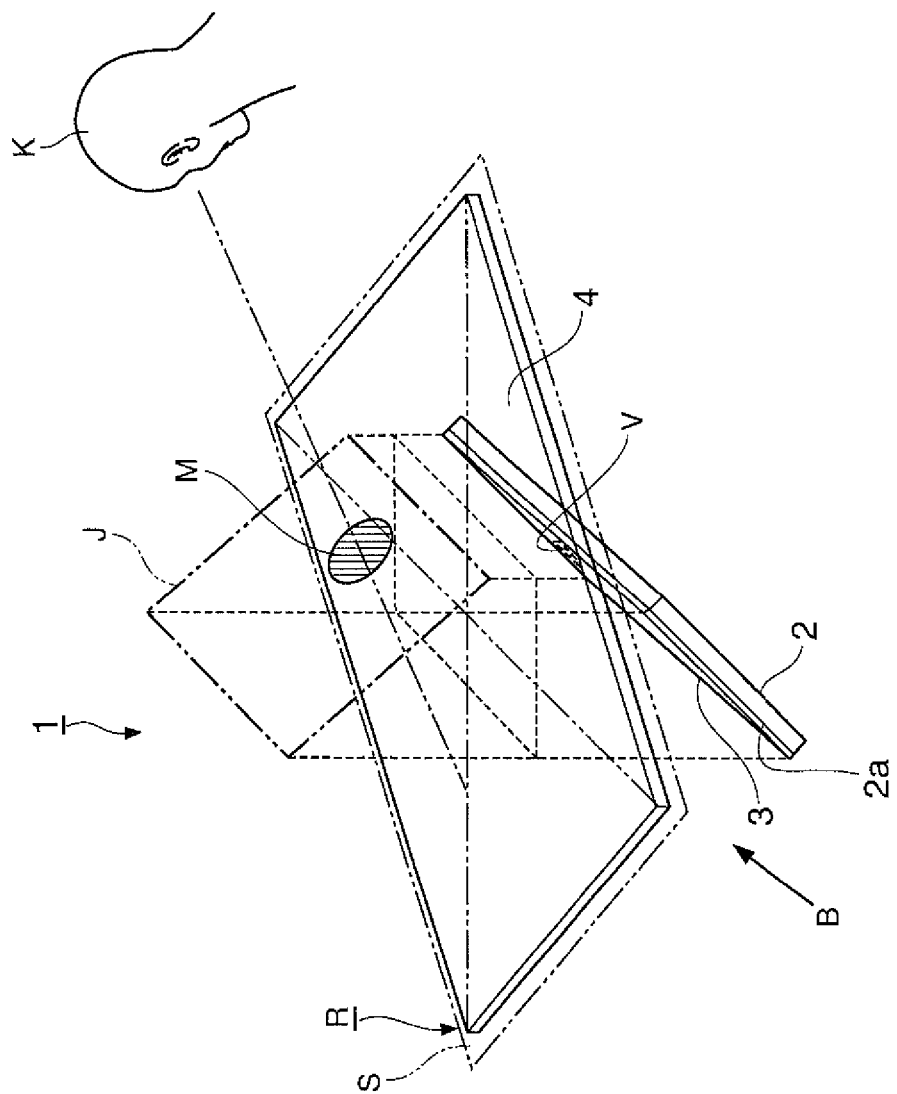
FIG. 1 is a perspective view showing a display device of a first embodiment of the invention.

FIG. 1 is a perspective view showing a schematic configuration of the display device of the embodiment.

Note that, in all of the following drawings, the scale of dimensions may be made different depending on component elements for facilitating visualization of the respective component elements.

As shown in FIG. 1, the display device 1 of the embodiment includes a flat panel display 2 (object image generator), a diffusion angle limiting film 3 (diffusion angle limiting member), and a retrotransmissive material 4 (imaging element). In the following explanation, the flat panel display 2 will be abbreviated to FPD. The FPD 2 displays characters and images on an image display surface 2a (image generation surface) based on image signals input from the outside. In the following explanation, the characters and images displayed on the image display surface 2a is referred to as "object image V". On the image display surface 2a of the FPD 2, the diffusion angle limiting film 3 to be described later is provided. As the FPD 2, for example, a general display including but not limited to a liquid crystal display, a plasma display, or an organic EL display may be used.

Figure 2A:
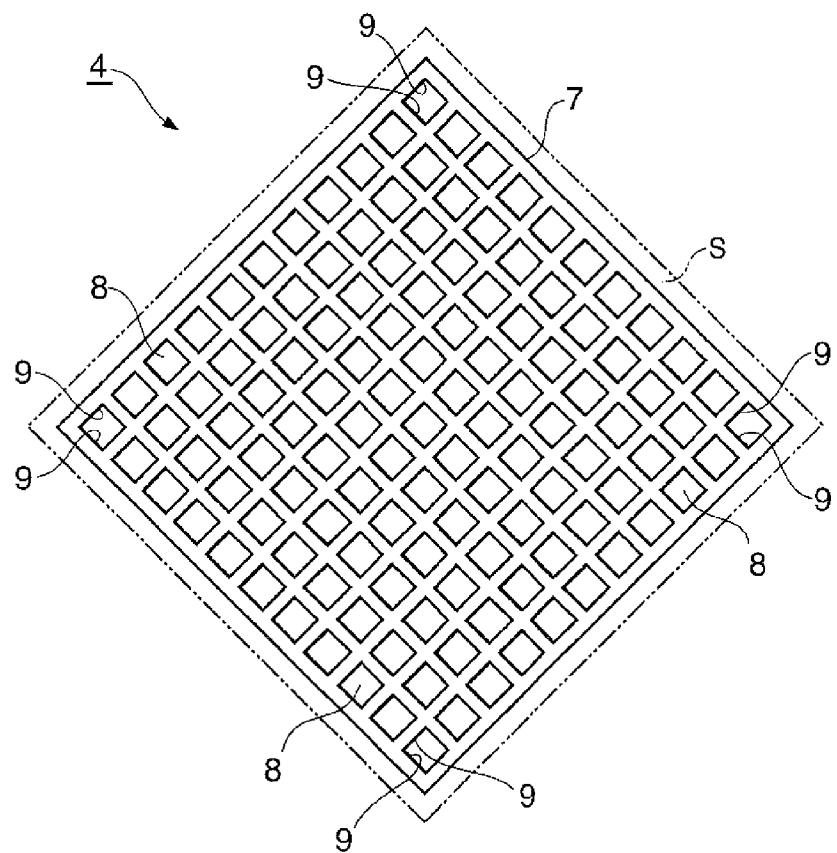
FIGS. 2A and 2B show a retrotransmissive material used for the display device of the embodiment.
Figure 2B:
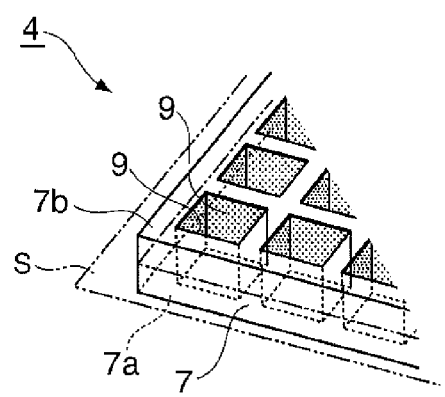

As shown in FIGS. 2A and 2B, the retrotransmissive material 4 has a plate material 7 such as glass in a rectangular shape having a predetermined thickness with plural opening parts 8 having square pillar shapes for light transmission. The opening parts 8 may be empty spaces or filled with a resin material with high transparency. These opening parts 8 function as light transmission parts. The planar shape of the opening part 8 as seen from a direction perpendicular to the element surface S is square. The plate material 7 has two principal surfaces 7a, 7b in parallel to each other, and light is allowed to enter from one principal surface 7a side and light is allowed to exit from the other principal surface 7b side. "Element surface" in this specification is defined as a flat surface in parallel to the two principal surfaces 7a, 7b of the plate material 7 and a virtual flat surface passing through the center of the plate material 7 at equal distances from the two principal surfaces 7a, 7b.

Of the four inner wall surfaces of the opening part 8, for example, metal reflection films are formed on the two inner wall surfaces orthogonal to each other, and the two inner wall surfaces serve as reflection surfaces 9. These two reflection surfaces 9 form the so-called dihedral corner reflector. In the retrotransmissive material 4 of the embodiment, as shown in FIG. 2A, the respective sides of the opening part 8 having the square shape in the plan view are formed in parallel to the respective sides of the plate material 7. In all opening parts 8, the two reflection surfaces 9 face the same directions. Note that all of the four inner wall surfaces of the opening part 8 may be reflection surfaces.

As shown in FIG. 1, the FPD 2 is provided with the image display surface 2a at a tilt with respect to the element surface S of the retrotransmissive material 4. As seen from the direction perpendicular to the element surface S of the retrotransmissive material 4, the FPD 2 is provided with the normal line of the image display surface 2a at a tilt to face the side of the corner part in contact with the two reflection surfaces 9 of the opening part 8 of the retrotransmissive material 4. Thereby, the light output from the image display surface 2a of the FPD 2 generally travels in the direction of the corner part in contact with the two reflection surfaces 9 of the opening part 8 of the retrotransmissive material 4. In FIG. 1, for facilitating visualization of the drawing, the illustration of the opening parts 8 of the retrotransmissive material 4 is omitted. The location of the corner part in contact with the two reflection surfaces 9 of the opening part 8 of the retrotransmissive material 4 corresponds to the location of the corner part shown by sign R in FIG. 1 of the four corner parts of the retrotransmissive material 4.

Here, the action of the retrotransmissive material 4 will be explained using FIGS. 3A to 3E.

Figure 3A:
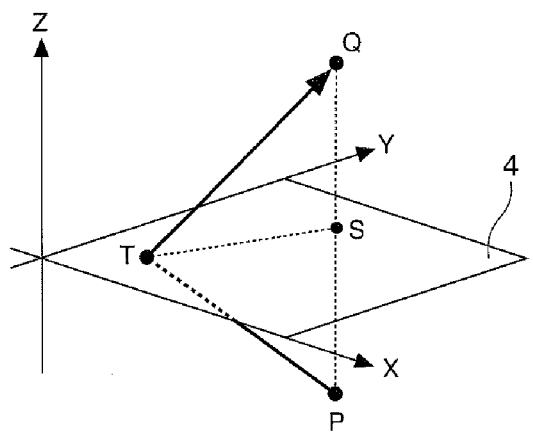
FIGS. 3A to 3E are diagrams for explanation of an action of the retrotransmissive material.
Figure 3B:
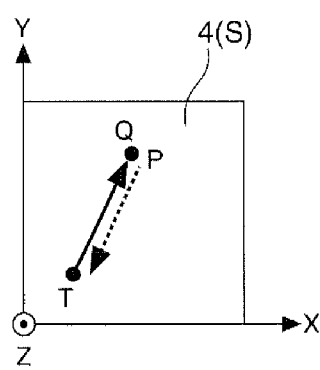
Figure 3C:
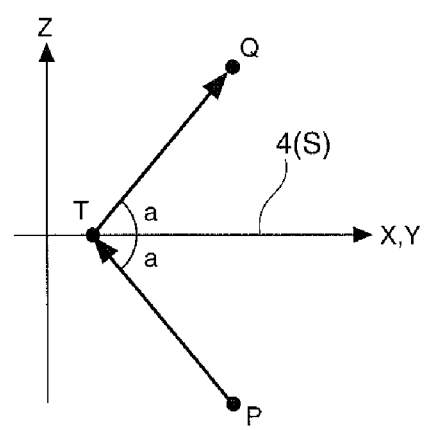
Figure 3D:
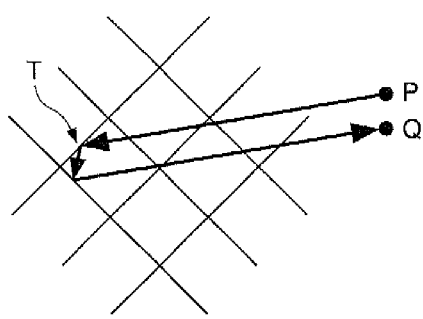
Figure 3E:
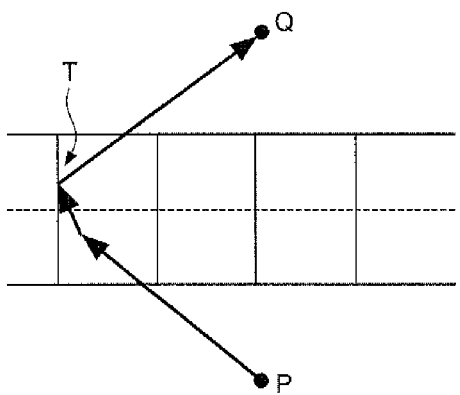

In FIGS. 3A to 3C, the element surface S of the retrotransmissive material 4 coincides with the XY plane formed by the X-axis and the Y-axis, and the axis orthogonal to the element surface S is the Z-axis. Further, the point at which light is output from the object image is shown by point P, the point at which light enters the reflection surface 9 of the retrotransmissive material 4 is shown by point T, and the point at which light is focused is shown by point Q. FIGS. 3D and 3E are enlarged views near the point T, and FIG. 3D is a plan view and FIG. 3E is a side view.

As described above, the two reflection surfaces 9 of the retrotransmissive material 4 are orthogonal to each other. Accordingly, as shown in FIG. 3D, the light entering one reflection surface 9 is reflected by the other reflection surface 9 adjacent thereto at an angle of 90 degrees. Therefore, as seen from the direction orthogonal to the element surface S (Z-axis direction), as shown in FIG. 3B, like a general retrotransmissive material, the light entering the reflection surface 9 is reflected in the same direction as the incident direction. That is, when the point P and the point Q are projected on the XY plane, the projected point of the point P coincides with the projected point of the point Q. On the other hand, as seen from the direction in parallel to the element surface S and orthogonal to the light incident surface (the normal direction of a triangle PTQ formed by the point P, the point T, and the point Q), as shown in FIG. 3E, the light is respectively reflected by the two reflection surfaces 9, and, as shown in FIG. 3C, the light entering the reflection surface 9 is reflected at the same reflection angle a as the incident angle a equally to the case where a normal reflector is perpendicularly placed.

As described above, as shown in FIG. 3A, the light output from the point P passes through the point T toward the point Q. Generally, the light output from the point P on the object image is diffused within an angle range to some degree, and enters other parts than the point T of the retrotransmissive material 4. However, the lights entering the other parts than the point T are similarly reflected and all of the diffused lights are focused on the point Q. That is, the object image located at one side of the element surface S is focused in a location plane-symmetrical with the element surface S in the space at the other side of the element surface S. In the above explanation, one point on the object image is shown by P, and even a part having a finite size is similarly focused. Therefore, in the case where a solid object exists around the point P, a real image plane-symmetrical with the element surface S of the retrotransmissive material 4 is generated as a stereoscopic image around the point Q. Note that, when the point Q on the real image is observed, the beams from the straight line connecting the observation point and the point Q are selectively seen, and the real image is seen floating in the space by observation with both eyes.

Further, the retrotransmissive material 4 has the opening parts 8 penetrating in the direction perpendicular to the element surface S, and thus, the light perpendicularly entering the element surface S of the retrotransmissive material 4 travels as it is without entering the reflection surface 9.

In the case of the embodiment, as shown in FIG. 1, the FPD 2 is provided at the tilt below the element surface S of the retrotransmissive material 4, and thus, a real image formation surface J is formed at a tilt in the direction plane-symmetrical with the tilt of the image display surface 2a of the FPD 2 in the space above the element surface S of the retrotransmissive material 4, and a real image M plane-symmetric with the object image is formed in the location of the real image formation surface J. In this case, the image display surface 2a of the FPD 2 is the flat surface, and thus, the generated real image M is a flat image different from the object image in inclination only, but equal thereto in shape and dimensions.

Therefore, when an observer K obliquely looks into the direction of the real image M from the tilted direction of the real image formation surface J, the real image M nearly faces the direction of the observer K and the observer easily sees the real image M. The generated real image M is formed by focusing of the reflected light by the retrotransmissive material 4, and thus, the real image M is seen floating in the space from the observer K in the observation range in which the observer can see the retrotransmissive material 4.

Figure 4:
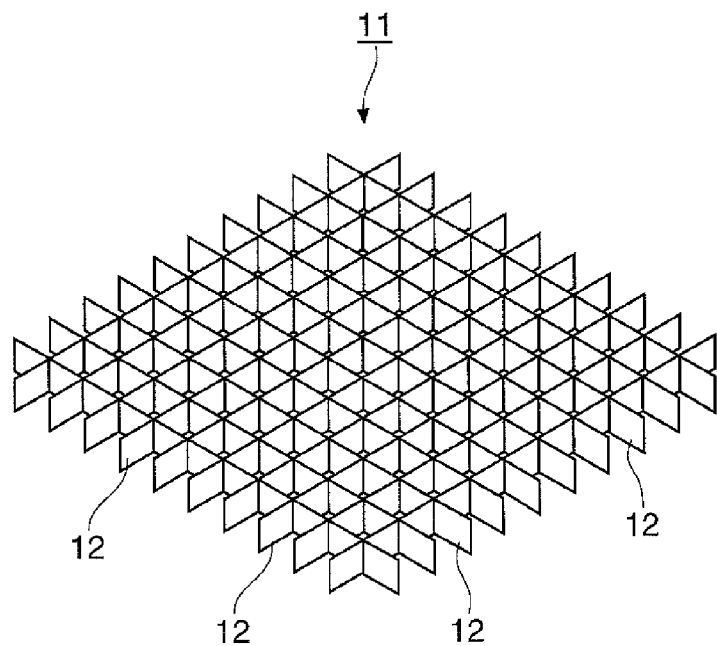
FIG. 4 is a perspective view showing another example of the retrotransmissive material.
Figure 5:
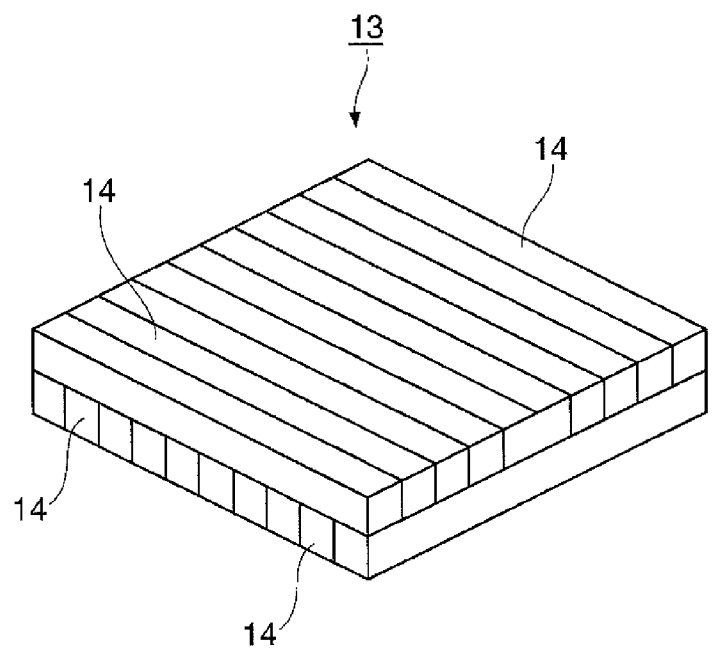
FIG. 5 is a perspective view showing yet another example of the retrotransmissive material.

As specific examples of the retrotransmissive material 4, not only the example shown in FIGS. 2A and 2B but also examples shown in FIGS. 4 and 5 may be cited.

A retrotransmissive material 11 shown in FIG. 4 is formed by assembling plural plate materials 12 of metal or glass having both or either surfaces as reflection surfaces orthogonally to each other in a lattice form. When only one surface of the plate material 12 is the reflection surface, it is necessary to arrange the plate materials 12 with the reflection surfaces of all plate materials 12 directed toward the observation direction. The spaces between the adjacent plate materials 12 may contain the air or may be filled with a resin material with high transparency.

A retrotransmissive material 13 shown in FIG. 5 is formed by forming two pairs of plural glass materials 14 having one surfaces in the longitudinal direction as mirror surfaces and arranged so that the mirror surfaces may be directed toward the same direction and stacking the two pairs with the mirror surfaces orthogonal to each other.

Figure 6:
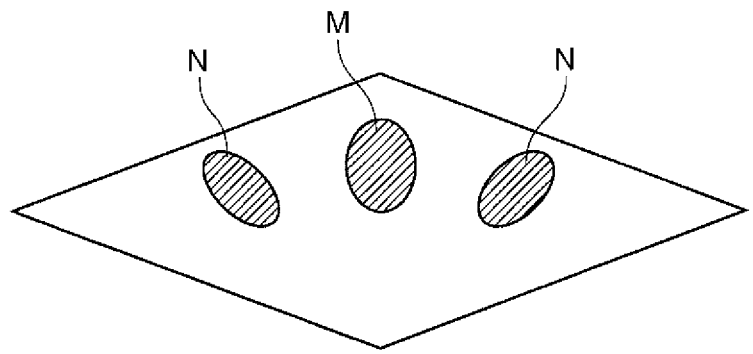
FIG. 6 shows visions of a real image and virtual images.

FIG. 6 shows images observed by the observer in FIG. 1.

In the case of the embodiment, the diffusion angle limiting film 3 is provided on the image display surface 2a of the FPD 2, and thus, only the real image M in FIG. 6 is seen floating. The reason will be explained later. However, if the diffusion angle limiting film 3 is not provided on the image display surface 2a of the FPD 2, two virtual images N are seen farther than the real image M. These virtual images N are originally unnecessary, and a problem that the real image M that should be seen becomes hard to be seen because the virtual images N are seen arises.

As below, the principle of generation of the virtual images N will be explained with reference to FIGS. 7A to 7C.

Figure 7A:
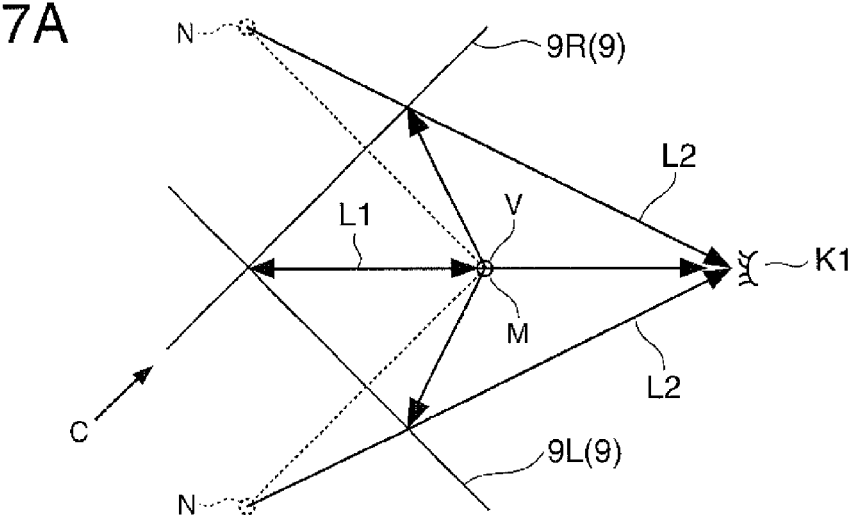
FIGS. 7A to 7C are diagrams for explanation of a generation principle of a virtual image.
Figure 7B:
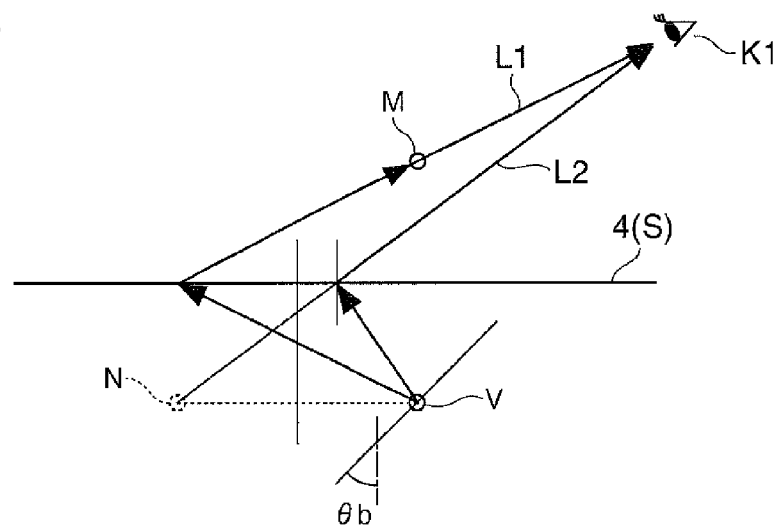
Figure 7C:
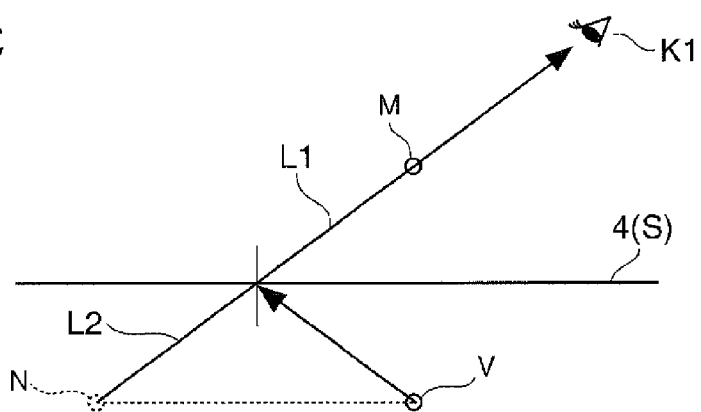

Note that FIGS. 7A to 7C show the reflection surfaces 9 separated with respect to each opening part 8 of the retrotransmissive material 4 in FIGS. 2A and 2B as continuously integrated reflection surfaces.

FIG. 7A is a plan view as seen from the normal direction of the element surface S of the retrotransmissive material 4. FIG.

7B is a side view as seen from the direction in parallel to the element surface S and in parallel to the image display surface 2a of the FPD 2 (the direction of arrow B in FIG. 1). FIG. 7C is a side view as seen from the direction in parallel to the element surface S and in parallel to one reflection surface 9 of the retrotransmissive material 4 (the direction of arrow C in FIG. 7A).

In the following explanation, the reflection surface 9 located at the right side as seen from the observer K is referred to as "right reflection surface 9R", and the reflection surface 9 located at the left side as seen from the observer K is referred to as "left reflection surface 9L".

As shown in FIG. 7A, the light beam from the object image V is reflected twice in the location of the intersection between the right reflection surface 9R and the left reflection surface 9L, and passes through the location of the real image M. In this regard, the light from the object image V diverges in various directions and, for example, the light beam traveling nearly in parallel to the one reflection surface 9 in the plan view exists. The case where the light beam traveling nearly in parallel to the one reflection surface 9 is reflected only once by the other reflection surface 9 occurs. When the light beam is reflected only once, a virtual image is generated in the location shown by the sign N as is the normal case of a single mirror. As shown in FIG. 7B, as seen from an observation location K1, the virtual image N is seen in the location slightly lower than that at a distance farther than the real image M. Note that the light beam from the real image M is shown by sign L1 and the light beam from the virtual image N is shown by sign L2.

In the plan view shown in FIG. 7A, the virtual image N is generated in the location symmetric with the real image M with respect to one reflection surface 9. Accordingly, the light beam L2 from the virtual image N as seen from the observation location K1 is inevitably obtained when the light beam L1 from the real image M is reflected outside of the extension of the perpendicular line to the one reflection surface 9 (the side father than the intersection between the right reflection surface 9R and the left reflection surface 9L).

As shown in FIG. 7C, when the side surface of FIG. 7B is seen from the direction in parallel to the right reflection surface 9R (the direction shown by the arrow C in FIG. 7A), the light beam L1 from the real image M and the light beam L2 from the virtual image N are seen overlapping. Therefore, it is known that, on the respective right reflection surfaces 9R and left reflection surfaces 9L arranged in the grid form, the real image M and the virtual image N are generated by the light beams reflected by the reflection surfaces 9 in the same rows.

FIG. 7A shows the case where the observer K sees the intersection between the right reflection surface 9R and the left reflection surface 9L from the front, i.e., the case where the line of vision of the observer K forms angles of 45 degrees with respect to the right reflection surface 9R and the left reflection surface 9L. On the other hand, FIG. 8 shows the case where the observer K sees the intersection between the right reflection surface 9R and the left reflection surface 9L from the location nearer the right than the front, i.e., the case where the line of vision of the observer K forms an angle less than 45 degrees with respect to the right reflection surface 9R.

Figure 8:
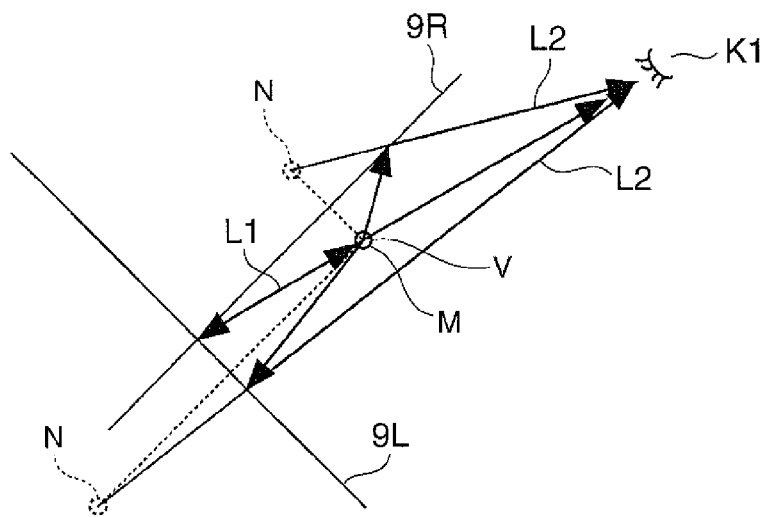
FIG. 8 shows FIG. 7A as seen from a different direction.

In the case of FIG. 8, unlike the case of FIG. 7A, the distances between the object image V and two virtual images N are different between the case where the light beam is reflected by the right reflection surface 9R and the case where the light beam is reflected by the left reflection surface 9L. However, the case of FIG. 8 is the same as the case of FIG. 7A in that the light beam L2 from the virtual image N is inevitably obtained when the light beam L1 from the real image M is reflected outside of the extension of the perpendicular line to the one reflection surface 9.

As below, the reason that the virtual image N disappears from view when the diffusion angle limiting film 3 is provided on the image display surface 2a of the FPD 2 will be explained.

Figure 9:
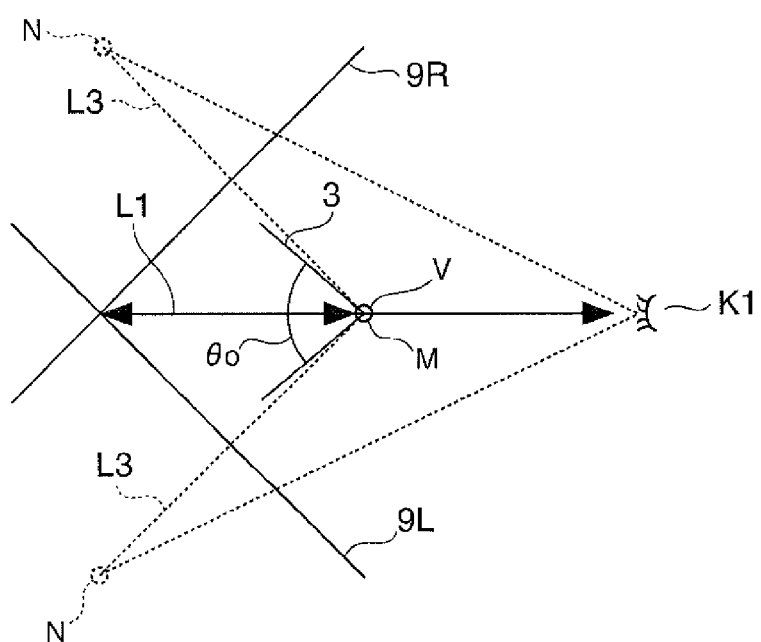
FIG. 9 is a diagram for explanation of an action of a diffusion angle limiting film.

In the embodiment, as shown in FIG. 9, the diffusion angle limiting film 3 is provided before the image display surface 2a of the FPD 2 and limits a diffusion angle $\theta_o$ of the light beam emitted from the object image V. That is, only the light beams within the range of the diffusion angle $\theta_o$ from the object image V are output. As shown in FIG. 9, the diffusion angle $\theta_o$ of the light beam emitted from the object image V in the plan view of the display device refers to a diffusion angle of the light beam emitted from the object image v as seen from the normal direction of the element surface S of the retrotransmissive material 4. As below, for convenience of explanation, the element surface S of the retrotransmissive material 4 coincides with the horizontal plane, and the diffusion angle $\theta o$ is referred to as "diffusion angle within horizontal plane $\theta o$". By the action of the diffusion angle limiting film 3, the light beams output from the location of the object image V in the diffusion direction to the outside of the diffusion angle within horizontal plane $\theta o$ are blocked, and the light beam L3 from the object image V toward the location of the virtual image N is blocked. As a result, the virtual image N is not generated.

Specifically, in order not to generate the virtual image N, the light beams emitted from the real image M may be reflected inside of the extension of the perpendicular lines to the respective reflection surfaces 9 (the side nearer the intersection between the right reflection surface 9R and the left reflection surface 9L). Accordingly, the diffusion angle within horizontal plane $\theta o$ may be limited to an angle less than 90 degrees. In this case, the virtual image N disappears from vision from the observation location K1, and only the real image M is seen. Further, the condition that the diffusion angle within horizontal plane $\theta_o$ may be an angle less than 90 degrees is not limited to the case of FIG. 9, and applies to the case where the observation location K1 is shifted from the front of the intersection between the right reflection surface 9R and the left reflection surface 9L as shown in FIG. 8.

Figure 10:
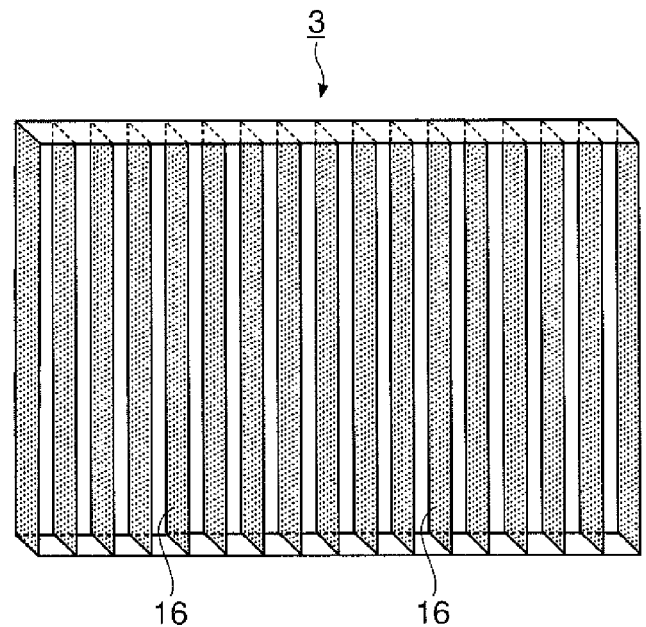
FIG. 10 is a perspective view showing an example of the diffusion angle limiting film.

FIG. 10 shows one specific example of the diffusion angle limiting film 3.

The diffusion angle limiting film 3 shown in FIG. 10 is a film-like member in which plural thin plate-like light-shielding plates 16 are arranged at fixed intervals in parallel, and spaces between the adjacent light-shielding plates 16 are empty or filled with a resin material with high transparency. The regions between the adjacent light-shielding plates 16 function as light transmission regions.

Figure 11:
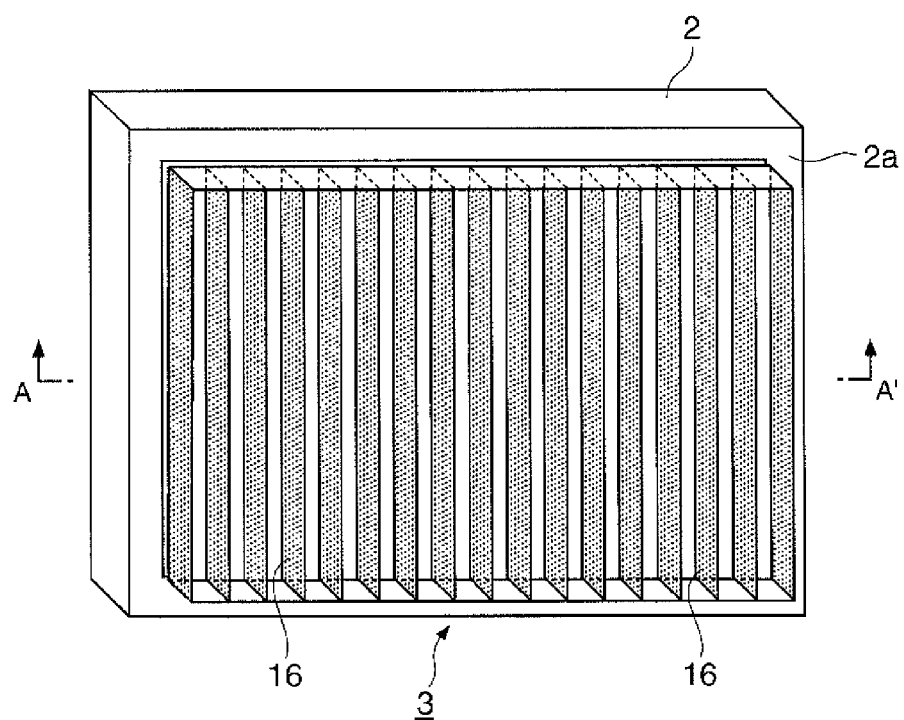
FIG. 11 is a perspective view showing a state in which the diffusion angle limiting film is attached to an FPD.
Figure 12:
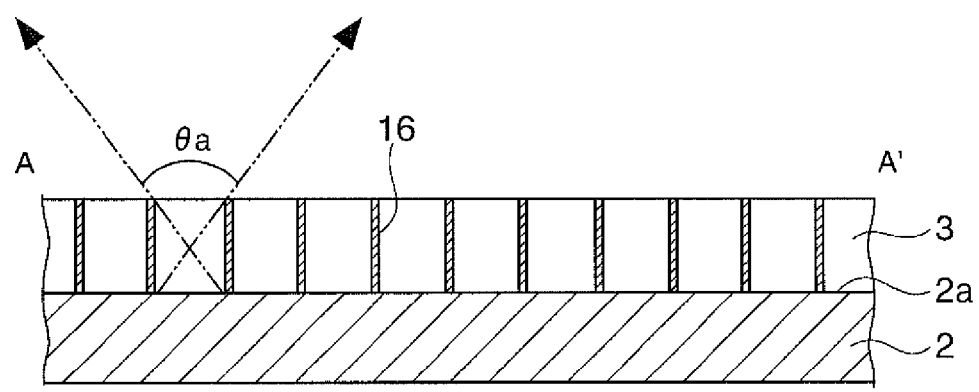
FIG. 12 is a sectional view along A-A' line in FIG. 11.

As shown in FIG. 11, the diffusion angle limiting film 3 is attached onto the image display surface 2a of the FPD 2 in close contact. In this regard, as shown in FIG. 12 as the sectional view along A-A' line in FIG. 11, the lights output from the object image V on the image display surface 2a of the FPD 2 in the diffusion directions at wide angles are blocked by the light-shielding plates 16. Only the lights having a diffusion angle $\theta a$ that may be output from the light transmission regions between the adjacent light-shielding plates 16 are output from the diffusion angle limiting film 3. As shown in FIG. 12, the diffusion angle $\theta a$ of the output lights from the diffusion angle limiting film 3 as seen from the direction in parallel to the image display surface 2a of the FPD 2 and in parallel to the respective light-shielding plates 16 is referred to as "effective diffusion angle θa" in the following explanation.

The image display surface 2a of the FPD 2 is tilted with respect to the element surface S of the retrotransmissive material 4, and thus, the above described diffusion angle within horizontal plane θo and effective diffusion angle θa are different. Specifically, the diffusion angle within horizontal plane θo is apparently smaller than the effective diffusion angle θa. Therefore, although the range in which the diffusion angle within horizontal plane θo should be limited may be less than 90 degrees, however, the range in which the effective diffusion angle θa should be limited may be set not to an angle less than 90 degrees, but a wider angle range.

As below, the range in which the effective diffusion angle θa should be limited will be calculated.

Figure 13C:
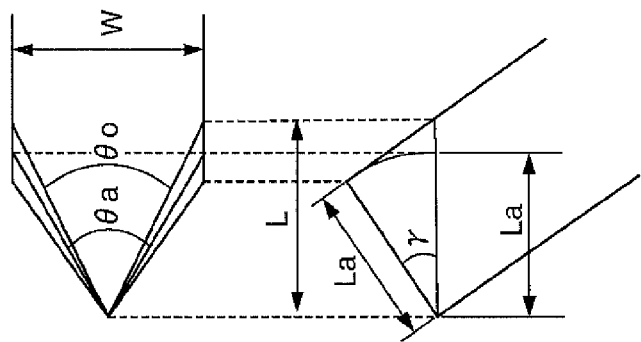
FIGS. 13A to 13C are diagrams used for calculation of a limit range of a diffusion angle by the diffusion angle limiting film.
Figure 13B:
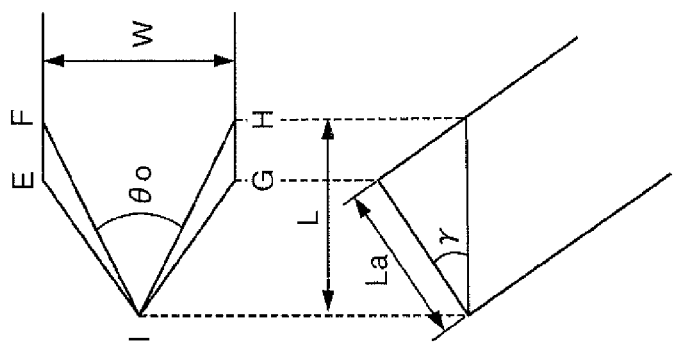
Figure 13A:
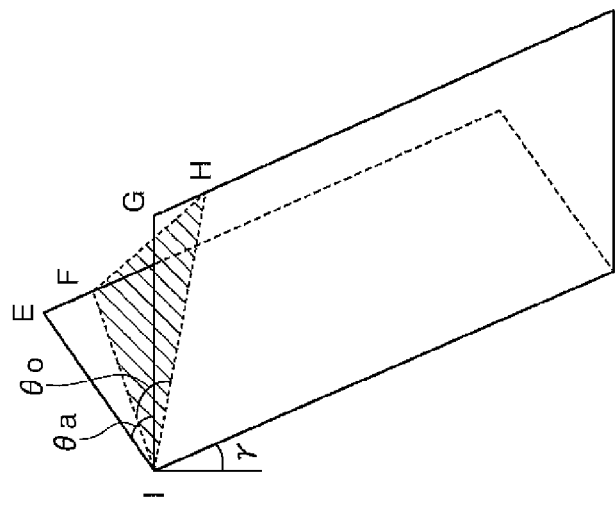

As shown in FIG. 13A, the tilt of the FPD 2 is expressed by the angle formed by the image display surface 2a of the FPD 2 and the normal line of the element surface S of the retrotransmissive material 4, and the angle is given by γ. The effective diffusion angle is θa and the diffusion angle within horizontal plane is θo. Further, in the figure of FIG. 13A showing the diffusion angle range, the respective locations of the figure are shown by points E, F, G, H, I.

The distance between the points E-G or the distance between the points F-H in FIG. 13B corresponds to the width of the light transmission region between the adjacent light-shielding plates 16, and the distance is given by w. The distance between the points I-E and the distance between the points I-G are given by La. The length of the perpendicular line extended from the point I with respect to the line segment connecting the point F and the point H is given by L.

Here, in order to obtain the effective diffusion angle θa, as shown in FIG. 13C, the figure is rotated clockwise around the point I by the angle γ until the point E and the point G becomes horizontal with the point I.

From the above description, the effective diffusion angle θa may be calculated in the following manner.

$$w = 2La \tan(\theta a/2) = 2L \tan(\theta o/2) \quad (1)$$

$$La = L \cos \gamma \quad (2)$$

from equation (1) and equation (2), $$L \cos \gamma \times \tan(\theta a/2) = L \tan(\theta o/2) \quad (3)$$

from equation (3), $$\tan(\theta a/2) = \tan(\theta o/2)/\cos \gamma \quad (4)$$

$$\theta a = 2 \times \tan^{-1}(\tan(\theta o/2)/\cos \gamma) \quad (5)$$

Therefore, the range in which the effective diffusion angle θa should be limited is as follows.

$$\theta a < 2 \times \tan^{-1}(\tan(\theta o/2)/\cos \gamma) \quad (6)$$

Specifically, for example, given that the tilt angle γ of the FPD 2 is 45 degrees and the diffusion angle within horizontal plane θo is 90 degrees, the effective diffusion angle θa is 109.5 degrees from equation (5). That is, when the diffusion angle limiting film 3 having the effective diffusion angle θa of 109.5 degrees is attached onto the FPD 2 and the FPD 2 is set so that the tilt angle γ may be 45 degrees, the diffusion angle within horizontal plane θo is 90 degrees. Therefore, the range in which the effective diffusion angle θa should be limited is less than 109.5 degrees from equation (6).

It is only necessary that the range in which the effective diffusion angle θa should be limited is an angle at which the diffusion angle within horizontal plane θo is less than 90 degrees and, given that θo in equation (6) is 90 degrees, the following relation is given.

$$\theta a < 2 \times \tan^{-1}(1/\cos \gamma) \quad (7)$$

However, if the diffusion angle within horizontal plane θo is too small, the brightness of the real image M becomes lower and the real image M is hard to be seen. Accordingly, it is desirable to set the effective diffusion angle θa so that the diffusion angle within horizontal plane θo may be slightly smaller than 90 degrees.

Figure 14:
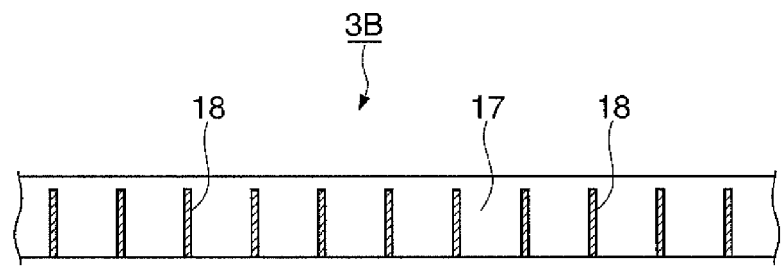
FIG. 14 is a perspective view showing another example of the diffusion angle limiting film.

FIG. 14 shows another example of the diffusion angle limiting film 3.

A diffusion angle limiting film 3B shown in FIG. 14 is a film-like member in which plural narrow grooves are formed at fixed intervals in parallel on a resin plate 17, and light-shielding layers 18 are provided within the grooves. The regions between the adjacent light-shielding layers 18 function as light transmission regions. When the diffusion angle limiting film 3B is manufactured, the resin plate 17 having plural grooves is molded using a die, then, the grooves are filled with black ink having a light shielding property, and thereby, the light-shielding layers 18 are obtained.

As explained above, according to the display device 1 of the embodiment, generation of the virtual image N may be reliably prevented using the diffusion angle limiting film 3. As a result, the display device by which the real image M is easily seen may be realized at low cost.

Second Embodiment

The second embodiment of the invention will be explained using FIGS. 15 and 16.

The basic configuration of a display device of the embodiment is the same as that of the first embodiment, and the configuration of the object image generator is different from that of the first embodiment.

Figure 15:
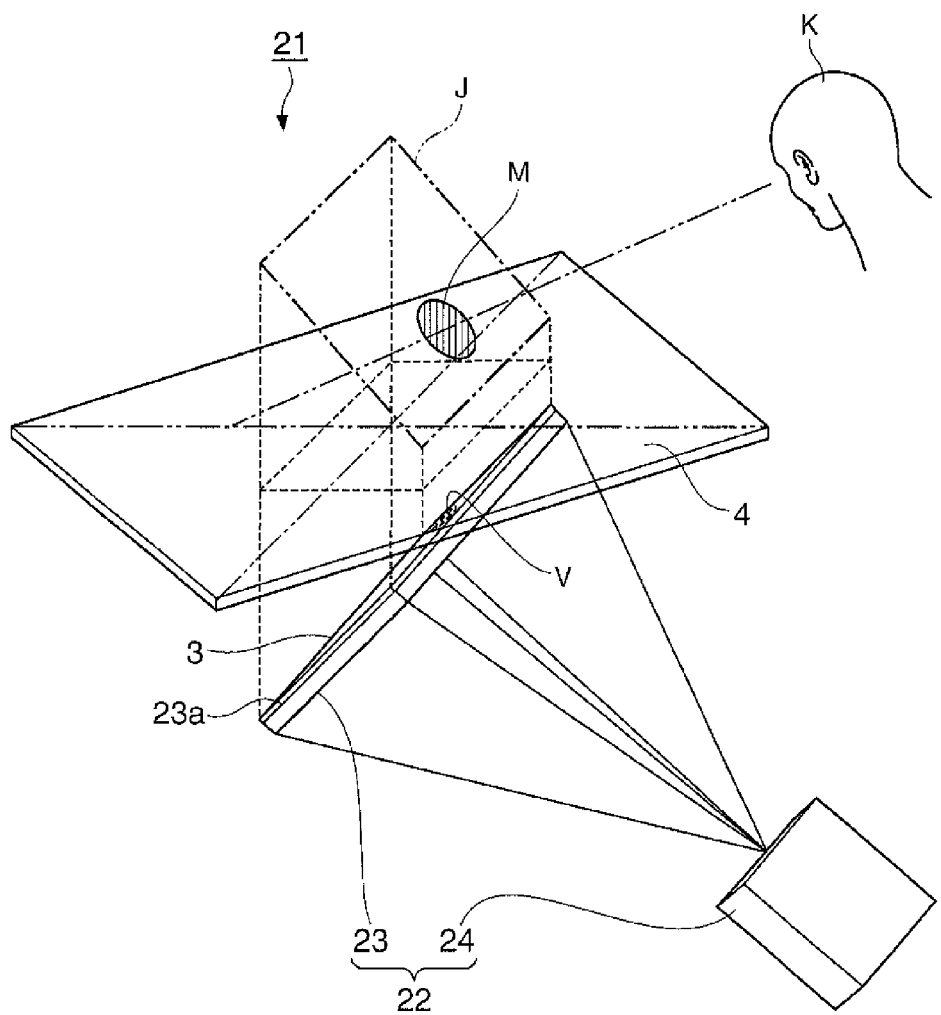
FIG. 15 is a perspective view showing a display device of a second embodiment of the invention.

FIG. 15 is a perspective view showing a schematic configuration of the display device of the embodiment. FIG. 16 is a sectional view of a screen and a diffusion angle limiting film used for the display device of the embodiment.

Figure 16:
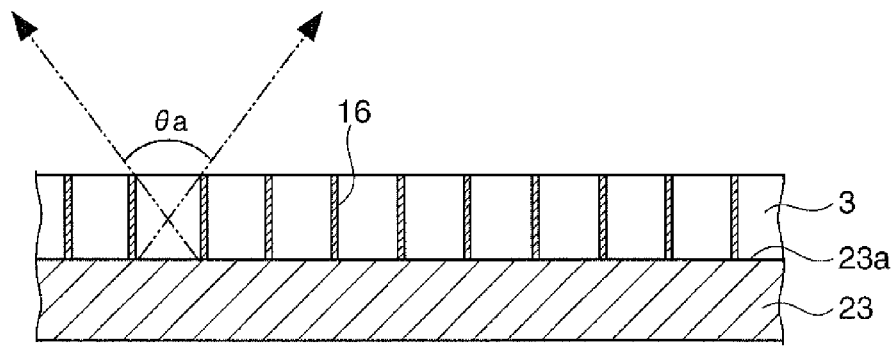
FIG. 16 is a sectional view of a screen and a diffusion angle limiting film used for the display device of the embodiment.

In FIGS. 15 and 16, the common component elements to those in the drawings of the first embodiment have the same signs and their explanation will be omitted.

As shown in FIG. 15, the display device 21 of the embodiment includes a projection system 22 (object image generator), the diffusion angle limiting film 3 (diffusion angle limiting member), and the retrotransmissive material 4 (imaging element). The projection system 22 includes a transmissive screen 23 and a projector 24 that projects an image on the screen 23. In the case of the embodiment, the screen 23 in place of the FPD 2 is provided in the location of the FPD 2 of the first embodiment. That is, the screen 23 is provided so that an image display surface 23a of the screen 23 may be tilted with respect to the element surface S of the retrotransmissive material 4.

On the image display surface 23a of the screen 23, the diffusion angle limiting film 3 having the plural light-shielding plates 16 is provided. The configuration of the diffusion angle limiting film 3 is the same as that of the first embodiment. Thereby, the lights diffused at wide angles from the object image V on the image display surface 23a of the screen 23 are blocked by the light-shielding plates 16, and the diffusion angles of the lights output from the object image V are limited within a predetermined angle range. The rest of the configuration is the same as that of the first embodiment.

Also, in the display device 21 of the embodiment, the same advantage that generation of the virtual image N may be reliably suppressed and the real image M is easily seen as that of the first embodiment may be obtained. Further, the object image generator includes the screen 23 and the projector 24, and thus, the display device with the high degree of freedom in installation method of the object image generator may be realized.

Third Embodiment

As below, the third embodiment of the invention will be explained using FIGS. 17 to 19.

A display device of the embodiment is the same as the second embodiment in that the object image generator includes the screen and the projector, and different from the second embodiment in the configuration of the diffusion angle limiting member.

Figure 17:
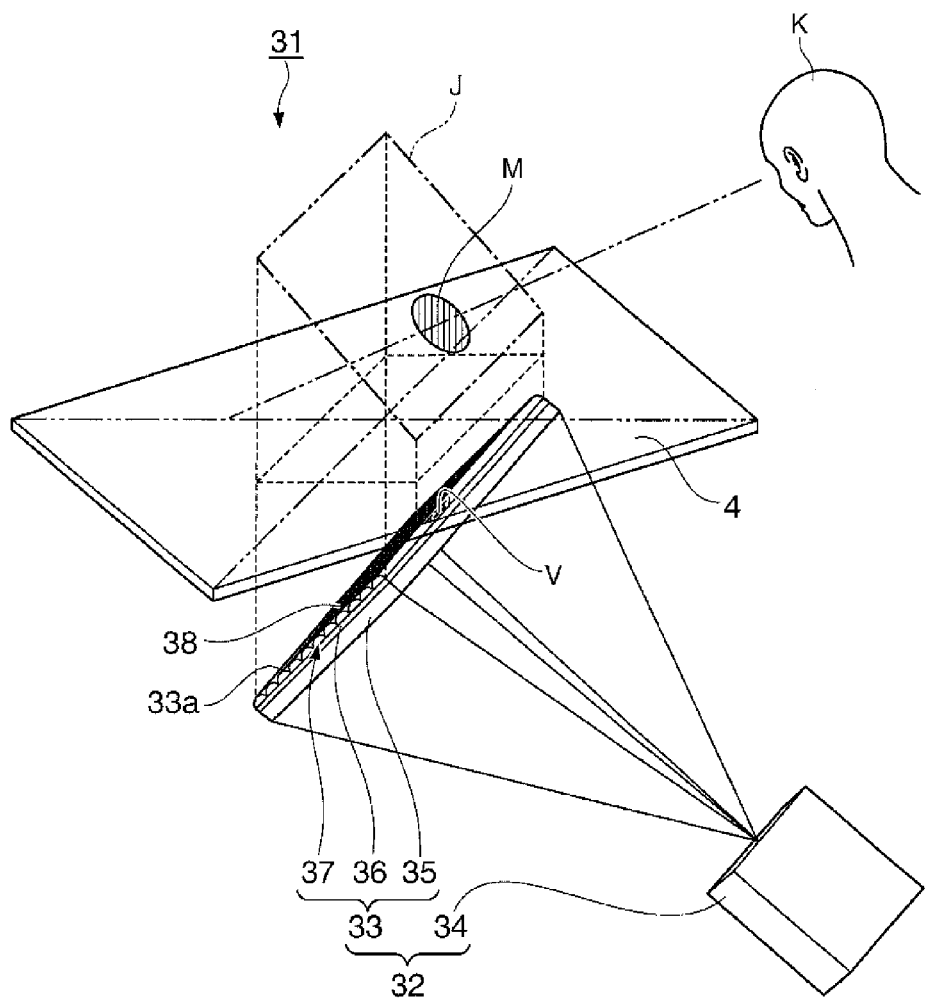
FIG. 17 is a perspective view showing a display device of a third embodiment of the invention.

FIG. 17 is a perspective view showing a schematic configuration of the display device of the embodiment. FIG. 18 is a sectional view of a screen assembly used for the display device of the embodiment.

Figure 18:
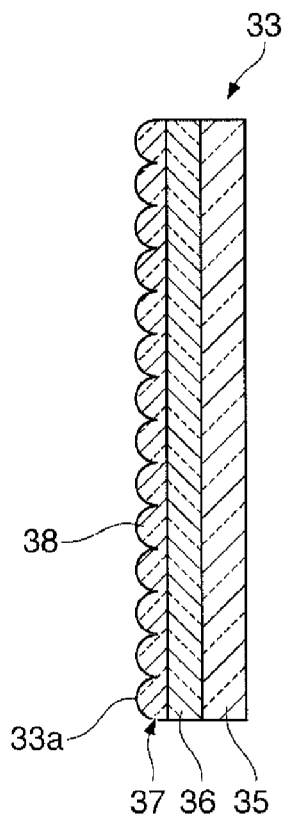
FIG. 18 is a sectional view of a screen assembly used for the display device of the embodiment.

In FIGS. 17 and 18, the common component elements to those in the drawings of the second embodiment have the same signs and their explanation will be omitted.

As shown in FIG. 17, the display device 31 of the embodiment includes a projection system 32 (object image generator) and the retrotransmissive material 4 (imaging element). The projection system 32 includes a screen assembly 33 and a projector 34 that projects an image on the screen assembly 33. In the case of the embodiment, the screen assembly 33 in place of the screen 23 is provided in the location of the screen 23 of the second embodiment. That is, the screen assembly 33 is provided so that an image display surface 33a of the screen assembly 33 may be tilted with respect to the element surface S of the retrotransmissive material 4.

As shown in FIG. 18, the screen assembly 33 has a configuration in which a Fresnel lens 35, an acrylic plate 36, and a lenticular lens 37 are stacked from the side near the projector 34. The Fresnel lens 35 has a focal distance nearly equal to the projection distance of the projector 34, and has a function of nearly parallelizing the diffused lights output from the projection lens of the projector 34. The acrylic plate 36 is a transparent plate material, and has a function as a holding member of the Fresnel lens 35 and the lenticular lens 37 and a function of reducing more by spacing the distance between the Fresnel lens 35 and the lenticular lens 37.

The lenticular lens 37 is a lens array in which plural cylindrical lenses 38 as unit lenses are arranged in the lateral direction. The cylindrical lens 38 has curvature in the lateral direction, but does not have curvature in the longitudinal direction. Therefore, the lenticular lens 37 has a function of diffusing lights at wider angles in the lateral direction of the cylindrical lenses 38, but not diffusing lights in the longitudinal direction of the cylindrical lenses 38. In the case of the embodiment, the lenticular lens 37 has the longitudinal direction of the cylindrical lenses 38 directed in a direction in parallel to the element surface S of the retrotransmissive material 4 and the lateral direction of the cylindrical lenses 38 directed in a direction perpendicular to the element surface S of the retrotransmissive material 4.

Figure 19:
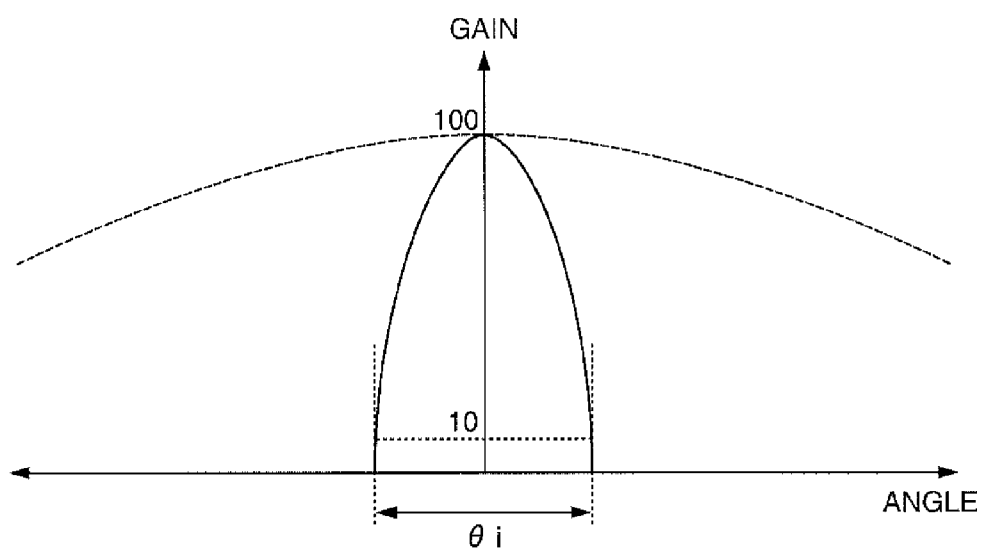
FIG. 19 shows gain characteristics of the screen assembly.

FIG. 19 shows gain characteristics of the screen assembly 33. The horizontal axis of FIG. 19 indicates the angle (polar angle) around the normal direction of the screen assembly 33, and the vertical axis indicates gain (relative value). The gain characteristic in the direction perpendicular to the element surface S of the retrotransmissive material 4 (vertical direction) is shown by a broken line, and the gain characteristic in the direction in parallel to the element surface S of the retrotransmissive material 4 (horizontal direction) is shown by a solid line.

As shown in FIG. 19, the gain characteristic of the screen assembly 33 in the vertical direction is relatively wider by the action of the lenticular lens 37. On the other hand, the gain characteristic in the horizontal direction is relatively narrower compared to the gain characteristic in the vertical direction. In other words, the screen assembly 33 has the lenticular lens 37, and thus, the diffusion angles of the lights output from the screen assembly 33 are limited to the horizontal direction. Thereby, also, in the display device 31 of the embodiment, generation of the virtual image N may be suppressed by the same action as those of the first and second embodiments.

In the case of the embodiment, given that the maximum gain in the normal direction of the screen assembly 33 is 100, an angle θi at which the gain is equal to or less than 10 is set to be smaller than 109.5 degrees as the effective diffusion angle θa of the first embodiment. The gain characteristics are determined by the characteristics of the respective component elements of the screen assembly 33. Therefore, the gain characteristics may be controlled by a method of providing diffusion characteristics to one of the component elements or the like, for example.

Also, in the display device 31 of the embodiment, the same advantage that generation of the virtual image N is reliably suppressed and the real image M is easily seen as those of the first and second embodiments may be obtained. In the case of the embodiment, there is another advantage that it is not necessary to provide another diffusion angle limiting member than the screen assembly 33.

Note that the technological field of the invention is not limited to the embodiments, and various changes can be made without departing from the scope of the invention. For example, in the embodiments, the diffusion angle limiting member that limits the diffusion angles of lights only to the horizontal direction has been used, however, in place of the diffusion angle limiting member, a diffusion angle limiting member that limits the diffusion angles of lights to both the horizontal direction and the vertical direction may be used. In this case, even in the observation from the angle at which the image display surface of the FPD or the like is directly seen from the observation location, the object image is not directly seen. As a result, an obstacle of the object image to observation of the real image may be suppressed.

For example, in the first embodiment, the configuration in which lights at wider diffusion angles are output from the FPD and the diffusion angles of the lights are limited by the diffusion angle limiting film attached outside of the FPD has been employed. In place of the configuration, for example, a configuration in which means for limiting the diffusion angles of the lights is provided within the FPD and the lights at limited diffusion angles are output from the FPD may be employed.

In the third embodiment, the lenticular lens has been used as the diffusion angle limiting member, and another optical element that can limit the diffusion angles may be used.

In addition, various component elements forming the display device can be appropriately changed.

The entire disclosure of Japanese Patent Application No. 2012-045685, filed Mar. 1, 2012 is expressly incorporated by reference herein.

What is claimed is:

1. A display device comprising:
an object image generator that generates an object image; and an imaging element that has an element surface tilted with respect to an image generation surface of the object image generator, reflects light emitted from the object image located at one side of the element surface twice, and forms the object image as a real image in a plane-symmetrical location with the element surface in a space at the other side of the element surface, wherein a diffusion angle of the light from the object image generator toward the imaging element is limited within a predetermined angle range;

wherein a diffusion angle limiting member that limits the diffusion angle of the light from the object image generator within the predetermined angle range is provided between the object image generator and the imaging element, wherein the diffusion angle limiting member includes a lens array in which plural unit lenses are arranged in one direction, and gain characteristics of the lens array are relatively wider in one direction of the unit lenses and relatively narrower in the other direction of the unit lenses.

2. The display device according to claim 1, wherein the diffusion angle limiting member includes a film-like member in which plural light-shielding parts are arranged at intervals in parallel and regions between the adjacent light-shielding parts are light transmission regions.

3. The display device according to claim 1, wherein the imaging element includes a retrotransmissive material having plural light transmission parts in which at least two wall surfaces orthogonal to each other of the wall surfaces of the light transmission part are reflection surfaces.

4. The display device according to claim 1, wherein the object image generator includes a flat panel display, and the image generation surface is an image display surface of the flat panel display.

5. The display device according to claim 1, wherein the object image generator includes a projector and a screen, and the image generation surface is an image display surface of the screen.

6. A display device comprising:

an object image generator that generates an object image; and an imaging element that has an element surface tilted with respect to an image generation surface of the object image generator, reflects light emitted from the object image located at one side of the element surface twice, and forms the object image as a real image in a plane-symmetrical location with the element surface in a space at the other side of the element surface, wherein a diffusion angle of the light from the object mage generator toward the imaging element is limited within a predetermined angle range, and wherein an apparent angle range of the predetermined angle range as seen from a direction perpendicular to the element surface is less than 90 degrees.

7. The display device according to claim 6, wherein, given that the predetermined angle range is $\theta a$ and an angle formed by a normal line of the element surface and the image generation surface is $\gamma$, $$\theta a < 2 \times \tan^{-1}(1/\cos \gamma)$$

is satisfied.

* * * * *